US010018407B2

(12) United States Patent
Chernov et al.

(10) Patent No.: US 10,018,407 B2
(45) Date of Patent: Jul. 10, 2018

(54) FILTER CARTRIDGE

(71) Applicant: General Electric Company, Schenectady, NY (US)

(72) Inventors: Gregory Sergeevich Chernov, Louisville, KY (US); Vinoth Chandran, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 341 days.

(21) Appl. No.: 14/834,712

(22) Filed: Aug. 25, 2015

(65) Prior Publication Data
US 2017/0056794 A1    Mar. 2, 2017

(51) Int. Cl.
*B01D 35/00* (2006.01)
*F25D 23/12* (2006.01)
*F25C 5/20* (2018.01)

(52) U.S. Cl.
CPC .............. *F25D 23/12* (2013.01); *F25C 5/22* (2018.01); *F25D 23/126* (2013.01); *B01D 2201/4015* (2013.01); *B01D 2201/52* (2013.01); *B01D 2201/56* (2013.01); *F25C 2500/06* (2013.01); *F25D 2323/121* (2013.01)

(58) Field of Classification Search
None
See application file for complete search history.

(56) References Cited

U.S. PATENT DOCUMENTS

| 3,995,636 A | 12/1976 | Murray et al. |
| 4,497,707 A * | 2/1985 | Anderson .......... B01D 17/0202 210/136 |
| 4,521,309 A * | 6/1985 | Pall .......... B01D 27/08 210/493.2 |
| 4,619,677 A * | 10/1986 | Matheson .......... B01D 46/0005 210/304 |
| 4,855,077 A | 8/1989 | Shikinami et al. |
| 5,089,144 A | 2/1992 | Ozkahyaoglu et al. |
| 5,135,645 A | 8/1992 | Sklenak et al. |
| 5,171,430 A * | 12/1992 | Beach .......... B01D 35/30 210/440 |
| 5,190,666 A | 3/1993 | Bisconte |
| 5,192,424 A | 3/1993 | Beyne et al. |
| 5,328,597 A | 7/1994 | Boldt, Jr. et al. |

(Continued)

FOREIGN PATENT DOCUMENTS

| JP | 2001016025 A | 1/2001 |
| JP | 2003192096 A | 7/2003 |

(Continued)

OTHER PUBLICATIONS

PCT Search Report and Written Opinion PCT/US2014/056282, dated Nov. 27, 2014, (11 pages).

(Continued)

*Primary Examiner* — Richard C Gurtowski
(74) *Attorney, Agent, or Firm* — Dority & Manning, P.A.

(57) ABSTRACT

A filter cartridge includes a casing that is mountable to a filter manifold. A leak collector is mounted to the casing at a bottom portion of the casing. The leak collector has a trough that extends about a sidewall of the casing. The trough of the leak collector is sized and positioned for receiving liquid flowing down the sidewall of the casing at the bottom portion of the casing.

16 Claims, 6 Drawing Sheets

(56) References Cited

U.S. PATENT DOCUMENTS

| | | |
|---|---|---|
| 5,536,264 A | 7/1996 | Hsueh et al. |
| 5,907,958 A | 6/1999 | Coates et al. |
| 6,009,404 A | 12/1999 | Eimer |
| 6,051,144 A | 4/2000 | Clack et al. |
| 6,139,738 A | 10/2000 | Maxwell |
| 6,303,031 B1 | 10/2001 | Senner |
| 6,355,177 B2 | 3/2002 | Senner et al. |
| 6,533,926 B2 | 3/2003 | Hawkins et al. |
| 6,537,444 B2 | 3/2003 | Wilberscheid et al. |
| 6,551,503 B2 | 4/2003 | Niers et al. |
| 6,753,783 B2 | 6/2004 | Friedman et al. |
| 6,865,941 B2 | 3/2005 | Gibbs |
| 6,950,032 B1 | 9/2005 | Hewitt et al. |
| 7,067,054 B2 | 6/2006 | Fritze |
| RE39,361 E | 10/2006 | Den Dekker |
| 7,481,917 B2 | 1/2009 | Ikeyama et al. |
| 7,638,042 B2 | 12/2009 | Astle et al. |
| 7,736,495 B2 | 6/2010 | Ikeyama et al. |
| 7,836,708 B2 | 11/2010 | Krause et al. |
| 8,118,997 B2 | 2/2012 | Ebrom et al. |
| 8,196,809 B2 | 6/2012 | Thorstensson |
| 8,216,463 B1 | 7/2012 | Baird |
| 8,242,893 B1 | 8/2012 | Lin |
| 8,282,820 B2 | 10/2012 | Cur et al. |
| 8,289,173 B2 | 10/2012 | Ben-Mansour et al. |
| 8,695,371 B2 | 4/2014 | Boarman et al. |
| 8,746,003 B2 | 6/2014 | Yoon |
| 9,046,299 B2 | 6/2015 | An et al. |
| 2002/0189983 A1 | 12/2002 | Guess et al. |
| 2004/0001991 A1 | 1/2004 | Kinkelaar et al. |
| 2004/0007516 A1 | 1/2004 | Fritze et al. |
| 2004/0251210 A1 | 12/2004 | Fritze et al. |
| 2005/0092070 A1 | 5/2005 | Bhatti |
| 2005/0167352 A1 | 8/2005 | Burrows et al. |
| 2005/0194317 A1 | 9/2005 | Ikeyama et al. |
| 2006/0011523 A1 | 1/2006 | Schrott et al. |
| 2006/0060512 A1 | 3/2006 | Astle et al. |
| 2006/0186031 A1 | 8/2006 | Fick et al. |
| 2008/0055112 A1 | 3/2008 | McGinty et al. |
| 2010/0100026 A1 | 4/2010 | Morris |
| 2010/0275633 A1 | 11/2010 | An et al. |
| 2011/0036109 A1 | 2/2011 | Krause et al. |
| 2011/0062060 A1 | 3/2011 | Royal et al. |
| 2011/0306782 A1 | 12/2011 | Taillefer et al. |
| 2012/0297817 A1 | 11/2012 | Krause et al. |
| 2013/0008838 A1 | 1/2013 | Burke et al. |
| 2013/0068673 A1 | 3/2013 | Maggiore et al. |
| 2013/0240431 A1 | 9/2013 | Foix et al. |
| 2014/0110331 A1 | 4/2014 | Baird |
| 2014/0200538 A1* | 7/2014 | Euliano .................. A61F 13/42 604/361 |
| 2014/0305930 A1 | 10/2014 | Heizer et al. |
| 2014/0353235 A1 | 12/2014 | Sherman et al. |
| 2015/0102931 A1 | 4/2015 | Chernov et al. |
| 2015/0290567 A1 | 10/2015 | Chernov et al. |
| 2015/0290568 A1 | 10/2015 | Chernov et al. |
| 2015/0290569 A1 | 10/2015 | Chernov et al. |

FOREIGN PATENT DOCUMENTS

| | | |
|---|---|---|
| JP | 2006258684 A | 9/2006 |
| JP | 2007147356 A | 6/2007 |
| JP | 2007163255 A | 6/2007 |
| JP | 1936305 A2 | 6/2008 |
| KR | 20120120844 A | 11/2012 |
| WO | WO 83/02523 A1 | 7/1983 |
| WO | WO 97/38272 A1 | 10/1997 |
| WO | WO 03/011426 A1 | 2/2003 |
| WO | WO 03/084875 A1 | 10/2003 |
| WO | WO 2004/037383 A1 | 5/2004 |
| WO | WO 2008/125530 A1 | 10/2008 |

OTHER PUBLICATIONS

PCT Search Report and Written Opinion PCT/US2014/060223, dated Jan. 23, 2015. (9 pages).

* cited by examiner

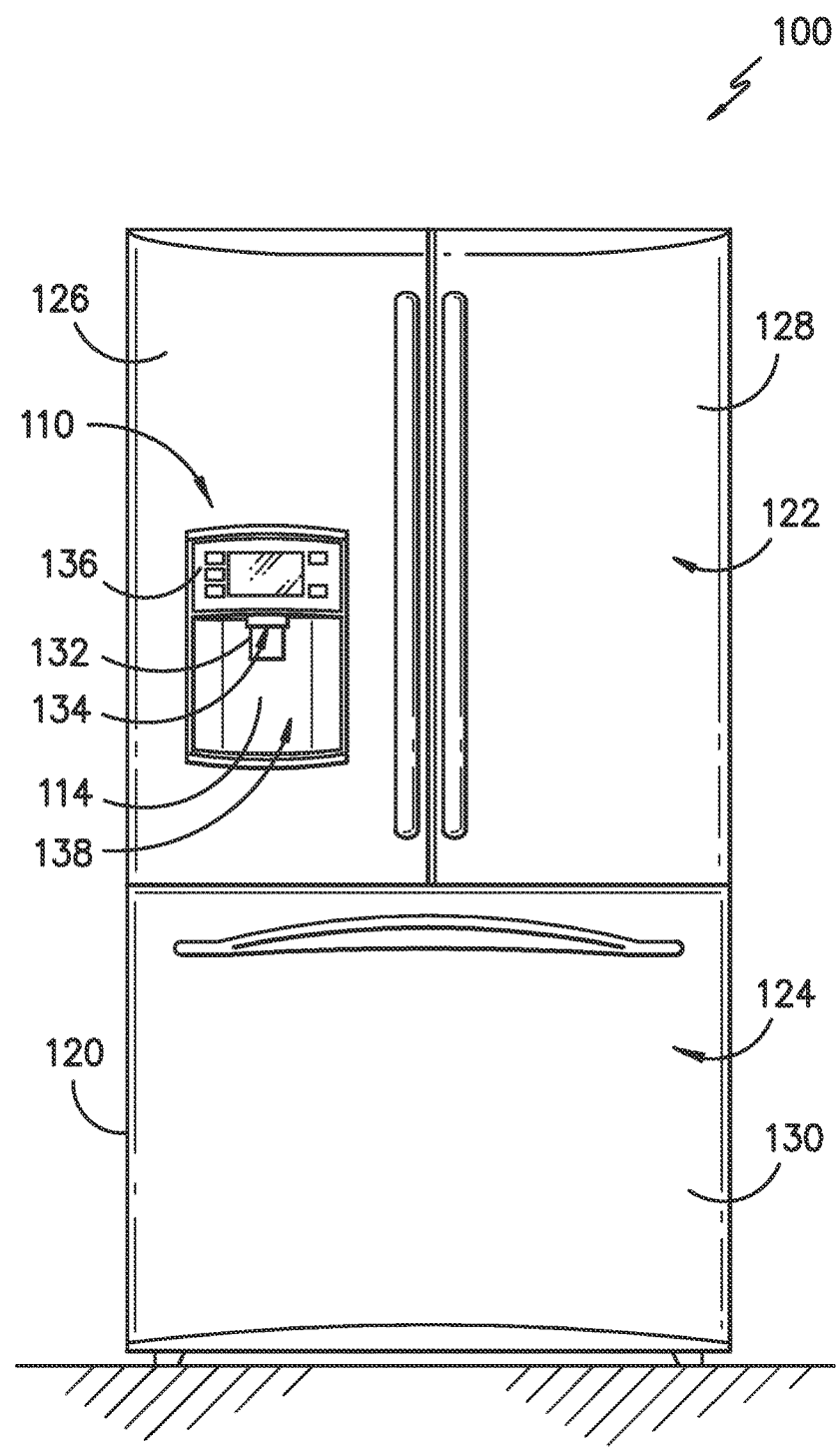
FIG. -1-

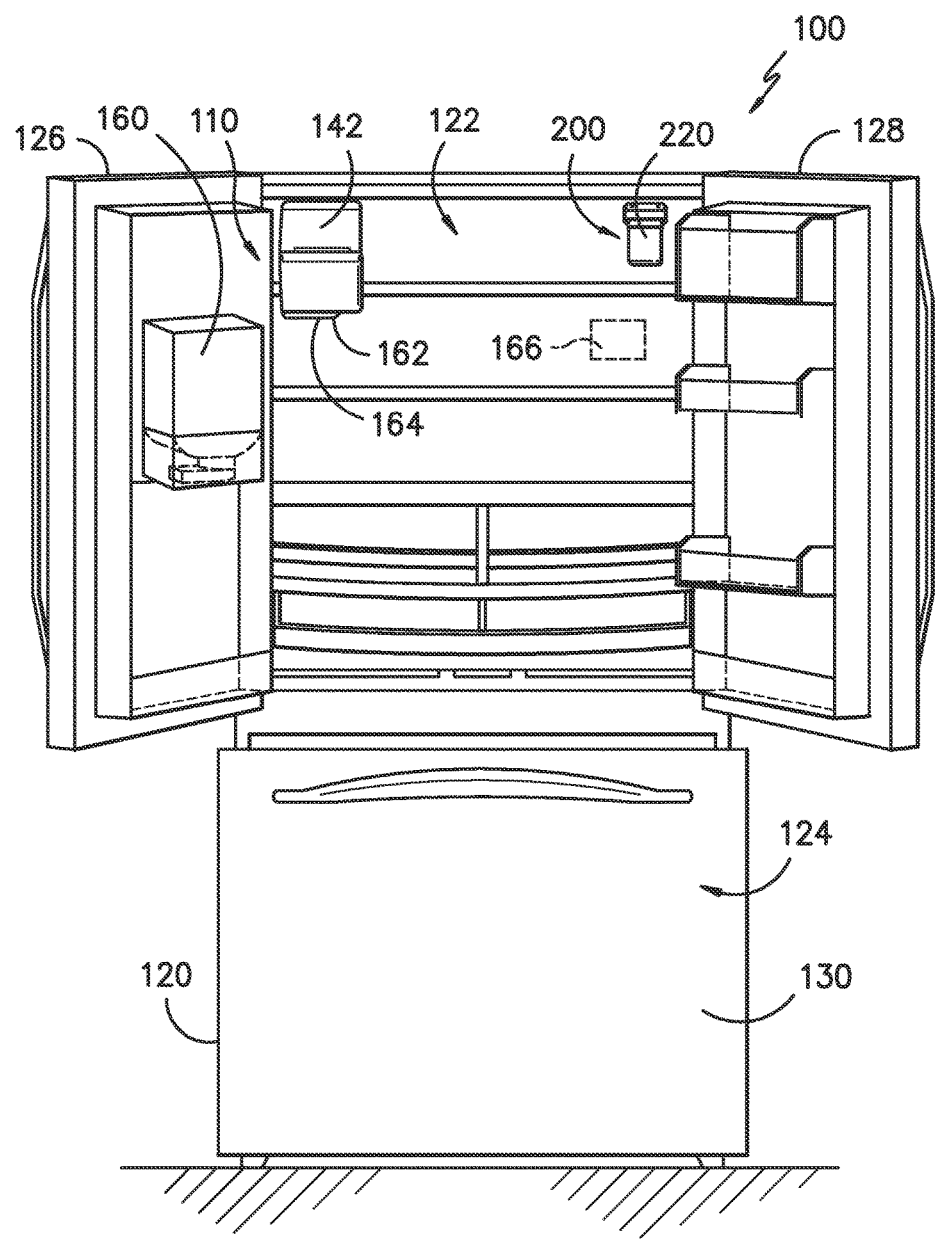
FIG. -2-

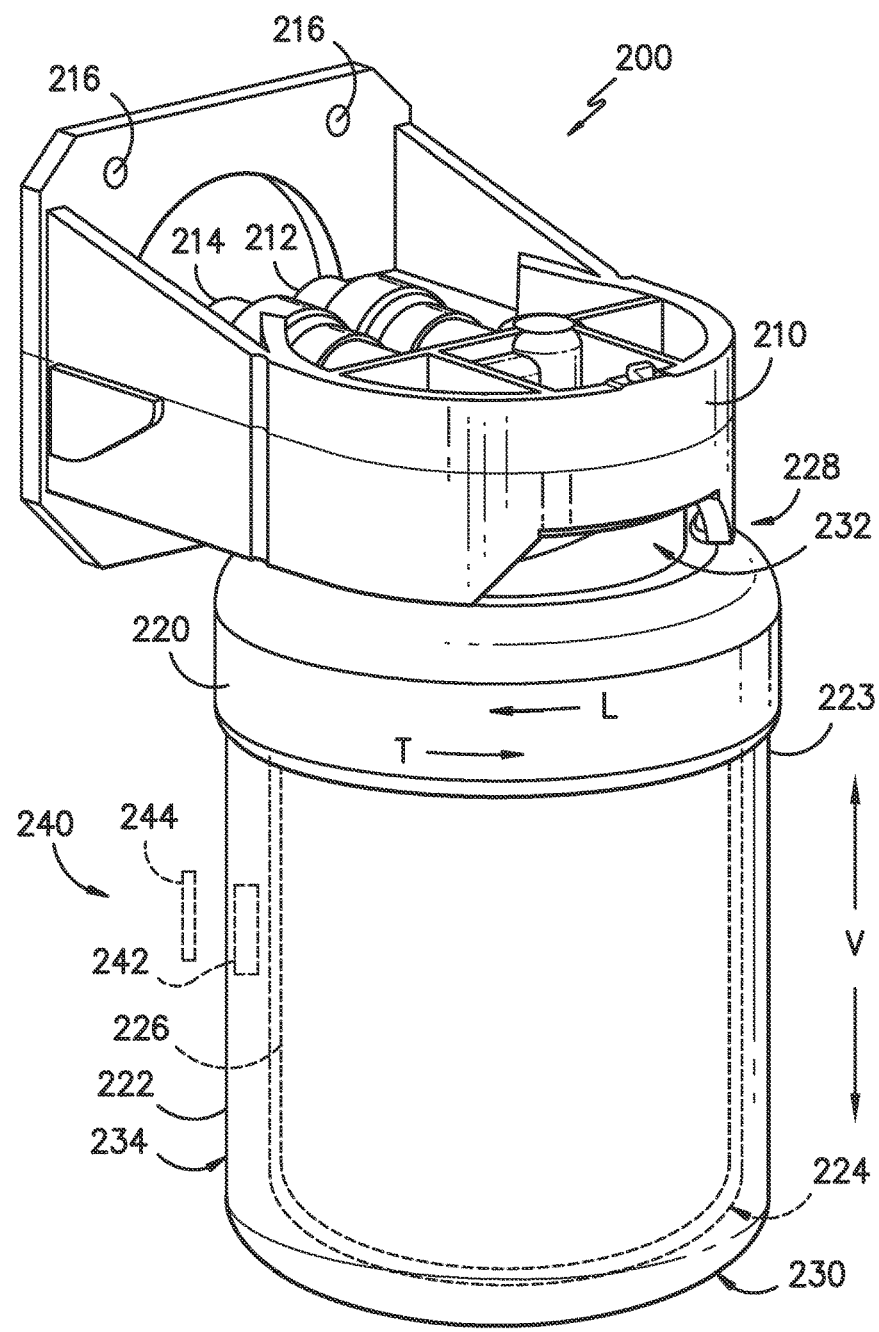
FIG. -3-

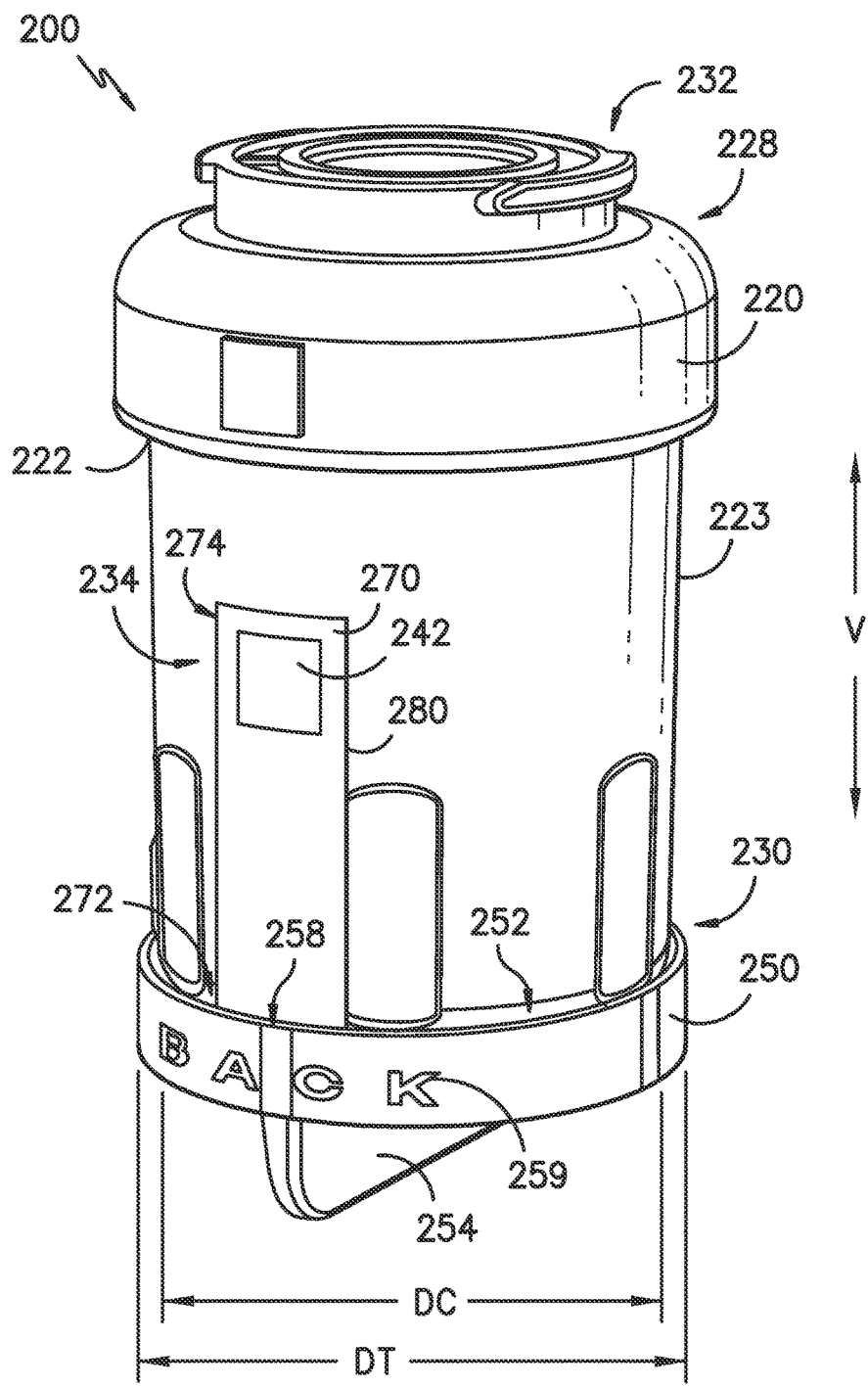
FIG. -4-

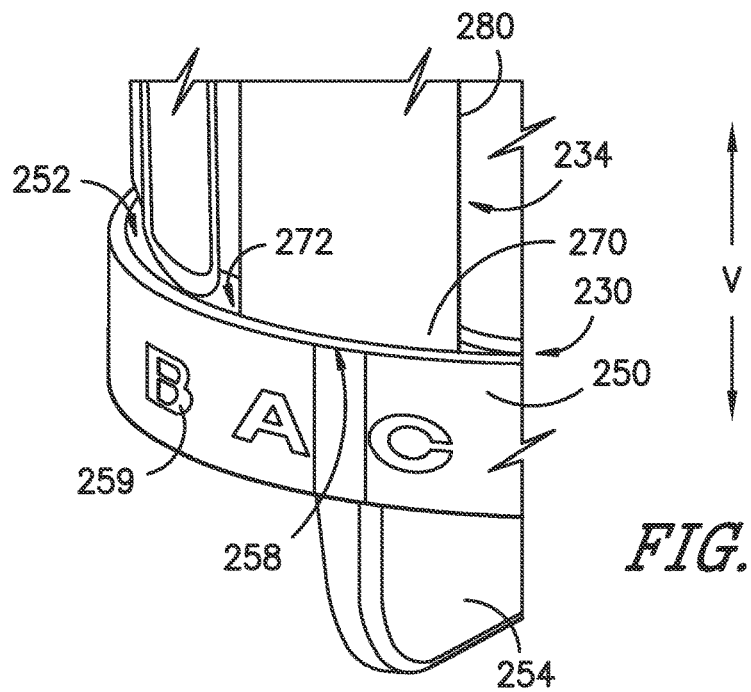
FIG. -5-
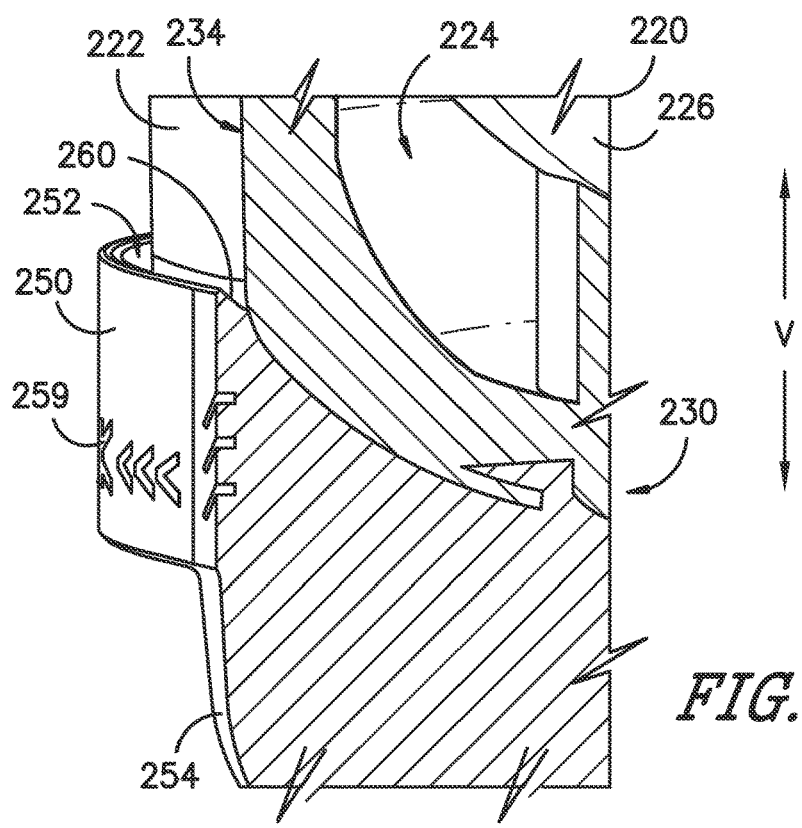
FIG. -6-

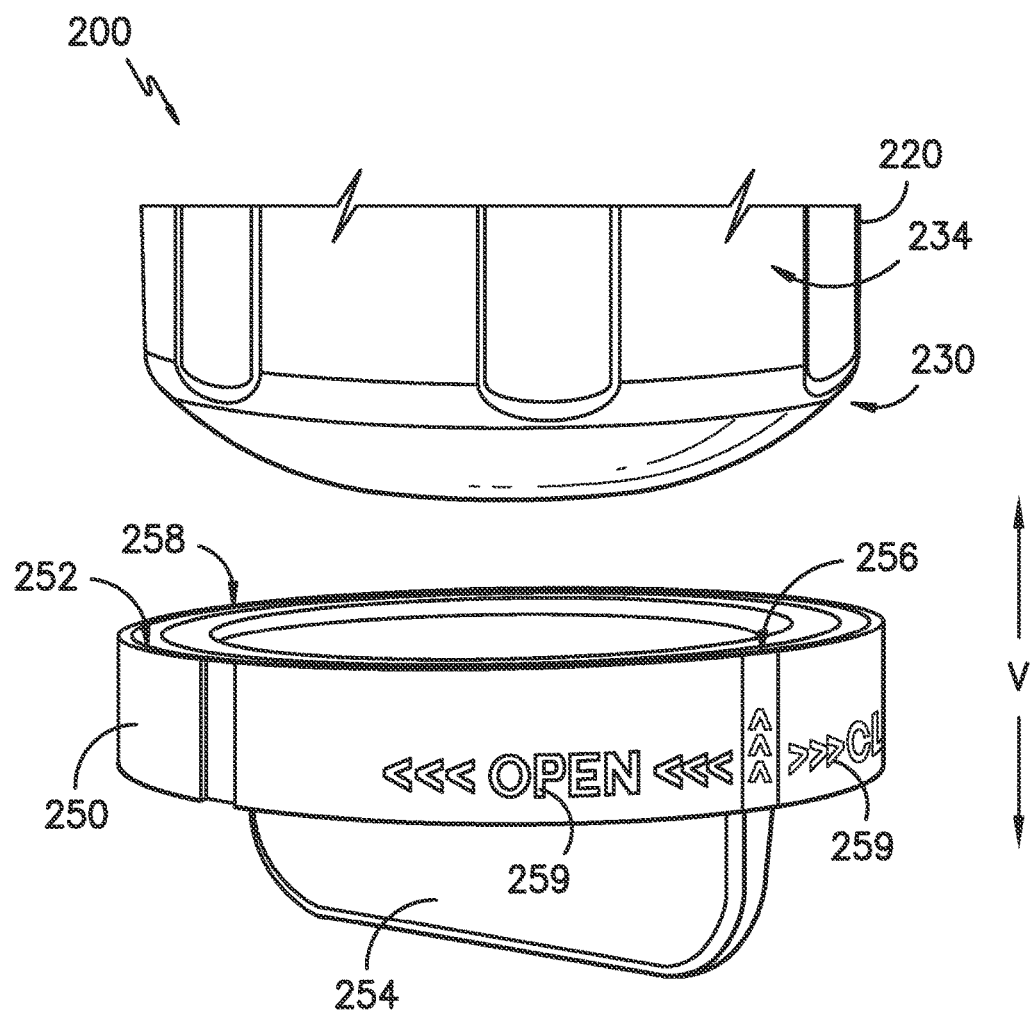
FIG. -7-

FILTER CARTRIDGE

FIELD OF THE INVENTION

The present subject matter relates generally to filter assemblies and filter cartridges for the same.

BACKGROUND OF THE INVENTION

Certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter medium loses effectiveness. For example, pores of the filter medium can become clogged or the filter medium can become saturated with contaminants. To insure that the filtering medium has not exceeded its filtering capacity, the filtering medium is preferably replaced or serviced at regular intervals regardless of its current performance. To permit replacement or servicing of the filter medium or the filter cartridge, the filter cartridge is generally removably mounted to the manifold.

Water leaks can form or develop at an interface or connection between the filter cartridge and the manifold, such as where the filter cartridge mounts to the manifold. As an example, such leaks can develop if the water filter assembly is installed incorrectly or is exposed to relatively high water pressures or freezing conditions. Such leaks can negatively affect operation of the water filter assembly and/or the refrigerator appliance and can cause damage if not prevented. Such leaks can also be difficult to detect. In particular, water filter assemblies are often positioned in relatively remote locations within refrigerator appliances such that visually monitoring the water filter assemblies for leaks can be difficult or infrequent. Similar problems can make detecting liquid water and water leaks difficult in other circumstances and locations as well.

Accordingly, a system for detecting liquid, such as liquid water, leaking from a filter would be useful.

BRIEF DESCRIPTION OF THE INVENTION

The present subject matter provides a filter cartridge with a casing that is mountable to a filter manifold. A leak collector is mounted to the casing at a bottom portion of the casing. The leak collector has a trough that extends about a sidewall of the casing. The trough of the leak collector is sized and positioned for receiving liquid flowing down the sidewall of the casing at the bottom portion of the casing. Additional aspects and advantages of the invention will be set forth in part in the following description, or may be apparent from the description, or may be learned through practice of the invention.

In a first exemplary embodiment, a filter cartridge is provided. The filter cartridge includes a casing having an exterior surface and an interior volume. The casing is mountable to a filter manifold. The casing also has a sidewall. A filter medium is disposed within the interior volume of the casing. A radio-frequency identification (RFID) tag is mounted to the casing at the exterior surface of the casing. A leak collector is mounted to the casing at a bottom portion of the casing. The leak collector has a trough that extends about the sidewall of the casing. The trough of the leak collector is sized and positioned for receiving liquid flowing down the sidewall of the casing at the bottom portion of the casing.

In a second exemplary embodiment, a filter assembly is provided. The filter assembly includes a manifold and a filter cartridge removably mounted to the manifold. The filter cartridge includes a casing having an exterior surface and an interior volume. The casing also has a sidewall. A filter medium is disposed within the interior volume of the casing. A radio-frequency identification (RFID) tag is mounted to the casing at the exterior surface of the casing. A leak collector is mounted to the casing at a bottom portion of the casing. The leak collector has a trough that extends about the sidewall of the casing. The trough of the leak collector is sized and positioned for receiving liquid flowing down the sidewall of the casing at the bottom portion of the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front view of an exemplary refrigerator appliance.

FIG. 2 provides a front view of the exemplary refrigerator appliance of FIG. 1 with refrigerator doors in an open position to shown a filter assembly according to an exemplary embodiment of the present subject matter.

FIG. 3 is a perspective view of the exemplary filter assembly of FIG. 2.

FIG. 4 provides a front, perspective view of a filter cartridge according to an exemplary embodiment of the present subject matter.

FIG. 5 provides a partial, perspective view of the exemplary filter cartridge of FIG. 4.

FIG. 6 provides a partial, section view of the exemplary filter cartridge of FIG. 4.

FIG. 7 provides an exploded view of certain components of the exemplary filter cartridge of FIG. 4.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100 as may be equipped with an exemplary fluid filter assembly of the present invention. However, as will be understood using the teachings disclosed herein, the fluid filter assembly (including the filter cartridge) of the present invention may be used with other refrigerator appliance configurations as well as other types of appliances. It may also be used in applications other than appliances as well. For example, the filtering system of the present invention may be installed under a kitchen sink or as part of a whole housing filtration system. As such, refrigerator appliance 100 is provided only by way of example of an application of the exemplary fluid filtration system of the present invention.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or microcontrol code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary filter assembly or fluid filtration system 200 that filters water coming into refrigerator appliance 100 from a water supply (not shown), such as a municipal water source or a well. Filter assembly 200 can remove contaminants, such as chlorine, chloroform, lead, arsenic, pharmaceuticals, microbes, and/or other undesirable substances, from water supplied to refrigerator appliance 100. In particular, filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, filter assembly 200 is shown positioned within fresh food chamber 122. However, filter assembly 200 may also be located e.g., on the exterior of refrigerator 100, on a surface adjacent to refrigerator 100, connected into a water supply line (not shown) providing fluid to refrigerator 100, and other locations as well. Also, as stated above, filter assembly 200 may also be located under a sink, configured as part of a whole house filtration system, or otherwise configured for other applications as well.

Referring now to FIG. 3, filter assembly 200 includes a manifold 210. A fluid inlet 212 and fluid outlet 214 are provided for a flow of unfiltered fluid into filter assembly 200 and a flow of filtered fluid out of filter assembly 200, respectively. Fluid inlet 212 and fluid outlet 214 are adapted for coupling manifold 210 to a fluid supply system such as e.g., the piping system within a user's dwelling that may be connected with a well or municipal water supply. By way of example, fluid inlet 212 and fluid outlet 214 may be equipped with slip fittings, threads, fasteners, and/or other mechanisms for attachment. Apertures 216 allow for connection of filter assembly 200 to a wall, cabinet, or other surface. Other methods of attachment may also be used.

Filter assembly 200 also includes a filter cartridge 220. Filter cartridge 220 includes a housing or casing 222 that defines an interior volume or chamber 224 into which a filter medium 226 is received. Filter medium 226 may be any suitable filter medium and may constructed from a variety of different types of filter media including textiles, resins, webs, and other components as well. Filtration with filter medium 226 may be based upon e.g., size exclusion, adsorption, and/or other mechanisms. Thus, filter medium 226 may include an activated carbon block, a reverse osmosis membrane, a pleated polymer or cellulose sheet, or a melt blown or spun cord medium. As used herein, the term "unfiltered" describes water that is not filtered relative to filtering medium 226. However, as will be understood by those skilled in the art, filter assembly 200 may include additional filters that filter water entering chamber 224. Thus, "unfiltered" may be filtered relative to other filters but not filter medium 226. While a variety of different constructions may be used, filter medium 226 may be a cylindrically-shaped and configured so that fluid flows radially inward towards a center of filter medium 226 as particulates or other matter are removed by filter medium 226.

Filter cartridge 220 may be mounted to manifold 210. In particular, filter cartridge 220 may be mounted to manifold 210 such that filter cartridge 220 is removable from manifold 210. Any suitable method or mechanism may be used to removably couple filter cartridge 220 to manifold 210. For example, filter cartridge 220 may be threaded to manifold 210. When filter cartridge 220 is mounted to manifold 210, filter cartridge 220 receives unfiltered water received from inlet 212 of manifold 210. Thus, filter cartridge 220 filters water passing through water filter assembly 200. Filter cartridge 220 extends between a top portion 228 and a bottom portion 230, e.g., along a vertical direction V. A connection 232 of filter cartridge 220 is positioned at or proximate top portion 228 of filter cartridge 220. Connection 232 of filter cartridge 220 is configured for engaging manifold 210, e.g., in order to removably mount filter cartridge 220 to manifold 210.

Connection 232 of filter cartridge 220 also places filter cartridge 220 in fluid communication with manifold 210 when filter cartridge 220 is mounted to manifold 210. Thus, filter cartridge 220 can receive unfiltered water from inlet 212 of manifold 210 at connection 232 and direct such unfiltered water into chamber 224 when filter cartridge 220 is mounted to manifold 210. Water within chamber 224 can pass through filter medium 226 positioned within chamber 224 and can exit chamber 224 as filtered water. In particular, connection 232 of filter cartridge 220 can direct filtered water out of chamber 224 to outlet 214 of manifold 210 when filter cartridge 220 is mounted to manifold 210. In such a manner, filter medium 226 of filter cartridge 220 can filter a flow of water through water filter assembly 200. Such filtering can improve taste and/or safety of water.

As will be understood by those skilled in the art, filtering medium 226 of filter cartridge 220 can lose efficacy over time. Thus, a user can replace filter cartridge 220 and/or filtering medium 226 of filter cartridge 220 at regular intervals or after a certain volume of water has passed through filter cartridge 220. To replace filter cartridge 220 and/or filtering medium 226 of filter cartridge 220, the user can remove or disconnect filter cartridge 220 from manifold 210 and insert or mount a new filter cartridge 220 or filtering medium 226 of filter cartridge 220.

Filter assembly 200 can be exposed to a variety of conditions within that can negatively affect performance of filter assembly 200. For example, high water pressure at inlet 212 of manifold 210 and/or connection 232 of filter cartridge 220 or exposing filter assembly 200 to freezing conditions can negatively affect performance of filter assembly 200. Such conditions can cause filter assembly 200 to leak, e.g., at connection 232 of filter cartridge 220. Such conditions can also cause filter assembly 200 to deform or crack. As discussed in greater detail below, filter assembly 200 includes features for detecting such malfunctions of filter assembly 200.

Filter assembly 200 includes a system 240 for detecting liquid water. System 240 includes a radio frequency identification reader or RFID reader 244 (shown schematically). System 240 also includes a radio frequency identification tag or RFID tag 242. RFID tag 244 is configured for receiving a signal from RFID tag 242. Thus, RFID tag 244 and RFID tag 242 can be in signal communication with each other as will be understood by those skilled in the art. For example, RFID tag 244 and RFID tag 242 may be in signal communication with each other as described in U.S. patent application Ser. No. 14/052,847 entitled "A Refrigerator Appliance and A Method For Monitoring A Water Filter Assembly Within The Same" and published as US2015/0101669 and/or U.S. patent application Ser. No. 14/052,837 entitled "A System And A Method For Detecting Liquid Water" and published as US2015/0102931, both of which are incorporated by reference herein in their entireties.

In certain exemplary embodiments, RFID tag 242 is a passive RFID tag. Thus, RFID tag 244 can receive a radio signal from RFID tag 242 in response to a query or request signal from RFID tag 244. In particular, RFID tag 242 can generate or transmit the response radio signal utilizing energy transmitted, e.g., wirelessly, to RFID tag 242 from RFID tag 244 via the query or request signal from RFID tag 244. Thus, RFID tag 242 need not include a battery or other power source in order to generate or transmit the response radio signal. In other exemplary embodiments, RFID tag 242 is an active RFID tag and includes a battery or is connected to a suitable power source. Thus, RFID tag 242 can continuously or intermittently generate or transmit a signal that RFID tag 244 can receive. As will be understood by those skilled in the art, RFID tag 244 and RFID tag 242 can have any other suitable setup or configuration for placing RFID tag 244 and RFID tag 242 in signal communication with each other. Thus, RFID tag 244 may be passive or active, and RFID tag 242 may be passive or active depending upon the desired setup of system 240.

As will be understood by those skilled in the art, signal communication between RFID tag 244 and RFID tag 242 is affected by a variety of factors. For example, signal communication between RFID tag 244 and RFID tag 242 can be limited or terminated if a gap between RFID tag 244 and RFID tag 242 is increased. RFID tag 244 and RFID tag 242 can also be tuned such that signal communication between RFID tag 244 and RFID tag 242 is established with a particular transmission medium, such as air, disposed between RFID tag 244 and RFID tag 242, e.g., within the gap between RFID tag 244 and RFID tag 242. Thus, the signal communication between RFID tag 244 and RFID tag 242 can be disrupted or terminated if the transmission medium changes and another material is positioned between RFID tag 244 and RFID tag 242. For example, if water is positioned between RFID tag 244 and RFID tag 242, the signal communication between RFID tag 244 and RFID tag 242 can be terminated or disrupted. In particular, liquid water can absorb radio waves and thereby terminate or disrupt signal communication between RFID tag 244 and RFID tag 242. Liquid water can also affect transmission and reception of radio waves by antennas of RFID tag 244 and/or RFID tag 242. As discussed in greater detail below, when signal communication between RFID tag 244 and RFID tag 242 is disrupted, lost or terminated, it can be inferred that liquid water is disposed between RFID tag 244 and RFID tag 242 (e.g., that liquid water is disposed within the gap between RFID tag 244 and RFID tag 242). For example, when signal communication between RFID tag 244 and RFID tag 242 is interrupted, it can be inferred that filter assembly 200 is leaking or otherwise malfunctioning.

FIG. 4 provides a front, perspective view of filter cartridge 220. FIG. 5 provides a partial, perspective view of filter cartridge 220. FIG. 6 provides a partial, section view of filter cartridge 220. FIG. 7 provides an exploded view of certain components of filter cartridge 220. As may be seen in FIGS. 4, 5, 6 and 7, filter assembly 200 includes features for collecting water leaking from filter assembly 200. In particular, filter cartridge 220 includes a leak collector or liquid collector 250. Liquid collector 250 is discussed in greater detail below in the context of FIGS. 4, 5, 6 and 7.

As may be seen in FIG. 4, casing 222 of filter cartridge 220 includes a sidewall 223. Sidewall 223 assists with defining chamber 224 of casing 222. Thus, sidewall 223 may be round or annular, and sidewall 223 may extend about or around filter medium 226. RFID tag 242 is positioned on casing 222 at an exterior surface 234 of casing 222. In particular, RFID tag 242 may be recessed within sidewall 223 of casing 222 at exterior surface 234 of casing 222.

Liquid collector 250 is positioned on casing 222 at bottom portion 230 of filter cartridge 220 below RFID tag 242, e.g., along the vertical direction V. Liquid collector 250 may be integrally formed on or with casing 222 at bottom portion 230 of filter cartridge 220. Thus, casing 222 and liquid collector 250 may be formed of or with a single piece of common material, such as plastic. As an example, casing 222 and liquid collector 250 may be formed of or with a piece of molded plastic. As another example, liquid collector 250 may be a separate piece of material that is mounted to casing 222 at bottom portion 230 of filter cartridge 220. Any suitable method or mechanism may be used to mount liquid collector 250 on casing 222 at bottom portion 230 of filter cartridge 220. For example, liquid collector 250 may be mounted to casing 222 with an adhesive or by spin welding or ultrasonic welding.

As may be seen in FIGS. 4 and 5, liquid collector 250 has a channel or trough 252. Trough 252 extends, e.g., circumferentially, about sidewall 223 of casing 222 at bottom portion 230 of filter cartridge 220. Thus, trough 252 may surround or encompass sidewall 223 of casing 222 at bottom portion 230 of filter cartridge 220. Liquid collector 250 is positioned for collecting liquid leaking from connection 232 of filter cartridge 220 and manifold 210. As an example, liquid collector 250, e.g., trough 252 of liquid collector 250, may be positioned below connection 232 of filter cartridge 220 and manifold 210, e.g., along the vertical direction V. Thus, liquid may leak from connection 232 of filter cartridge 220 and manifold 210 and flow into trough 252 of liquid collector 250 where the liquid can fill or pool within trough 252. As another example, liquid collector 250 may be positioned for collecting liquid leaking from filter cartridge 220. In particular, liquid may leak from a crack in filter cartridge 220. Such liquid may flow on exterior surface 234 of filter cartridge 220, e.g., downwardly along the vertical direction V. Such liquid may then flow into trough 252 of liquid collector 250 and fill or pool within trough 252.

System 240 also includes features for wicking liquid from a liquid collection location, such as trough 252 of liquid collector 250, to RFID tag 242. Thus, RFID tag 242 may detect liquid water and/or water leaks despite RFID tag 242 being spaced apart or remotely located from the liquid collection location. As an example, RFID tag 242 may be positioned above trough 252 of liquid collector 250, e.g., along the vertical direction V. As discussed above, trough 252 of liquid collector 250 can receive liquid leaking from filter cartridge 220 and/or connection 232 between filter cartridge 220 and manifold 210. Liquid within trough 252 of liquid collector 250 can be wicked upwardly to RFID tag 242 in order to disrupt or terminate the signal communication between RFID tag 244 and RFID tag 242.

System 240 includes a hydroscopic or absorbent material 260. Absorbent material 260 extends between a first end portion 262 and a second end portion 264, e.g., along the vertical direction V. First and second end portions 262 and 264 of absorbent material 260 are spaced apart from each other, e.g., along the vertical direction V. Thus, first and second end portions 262 and 264 of absorbent material 260 may be positioned at separate locations, and absorbent material 260 may wick or otherwise transfer liquid between the first and second end portions 262 and 264 of absorbent material 260. As an example, first end portion 262 of absorbent material 260 may be positioned at a liquid collection location, such as trough 252 of liquid collector 250. Conversely, second end portion 264 of absorbent material 260 may be positioned at or over RFID tag 242. Thus, second end portion 264 of absorbent material 260 and RFID tag 242 may be spaced apart from the liquid collection location, and absorbent material 260 may wick or otherwise transfer liquid from the liquid collection location to the RFID tag 242. In such a manner, absorbent material 260 may assist with permitting RFID tag 242 to be positioned remotely relative to the liquid collection location, and, thereby, permit detection of liquid with system 240 at locations where RFID tag 242 cannot be directly positioned.

Trough 252 of liquid collector 250 is sloped or inclined towards absorbent material 260. For example, first end portion 262 of absorbent material 260 may be positioned at a lowest point 258 of trough 252, e.g., along the vertical direction V. Thus, a bottom surface 260 of trough 252 may be sloped or angled towards first end portion 262 of absorbent material 260 within liquid collector 250. In particular, a highest point 256 of trough 252 may be positioned opposite first end portion 262 of absorbent material 260, e.g., and lowest point 258 of trough 252, about casing 222. In addition, bottom surface 260 of trough 252 may also slope or angle towards chamber 224 of casing 222, as shown in FIG. 6.

Absorbent material 260 may be any suitable absorbent material. For example, absorbent material 260 may be or include cellulose foam, paper or synthetic foam. In addition, an electrolyte may be disposed within absorbent material 260. Thus, absorbent material 260 may be doped with the electrolyte. Any suitable electrolyte may be disposed within absorbent material 260. For example, a water soluble electrolyte, such as sodium bicarbonate, sodium chloride or potassium sulfate, may be disposed within absorbent material 260. It should be understood that absorbent material 260 need not be a single, continuous piece of material. Thus, e.g., absorbent material 260 may be constructed of or with a plurality of absorbent pieces positioned adjacent each other.

As discussed above, RFID tag 242 may be inoperable or signal communication between RFID tag 242 and RFID tag 244 may be diminished, e.g., if liquid is disposed within absorbent material 260 at second end portion 264 of absorbent material 260. For example, liquid within absorbent material 260 at second end portion 264 of absorbent material 260 may short out the antenna of RFID tag 242. As another example, a resistance of absorbent material 260 can decrease (e.g., due to the electrolyte therein dissolving) thereby putting a load on the antenna of RFID tag 242. As the resistance drops, the load can increase until the load drains sufficient power from RFID tag 242 such that RFID tag 242 is disabled or deactivated and signal communication between RFID tag 244 and RFID tag 242 is disrupted or terminated. Further, when absorbent material 260 is wet, e.g., such that the electrolyte within absorbent material 260 is dissolved, the capacitance of the antenna of RFID tag 242 may be a second capacitance value. The second capacitance value can be selected such that the signal communication between RFID tag 244 and RFID tag 242 is disrupted or terminated due to the associated change in the resonant frequency of RFID tag 242.

As may be seen in FIG. 4, system 240 also includes an impermeable material 270, such as a plastic. Impermeable material 270 may be positioned over RFID tag 242 and/or absorbent material 260. As an example, impermeable material 270 may be mounted to filter cartridge 220 at outer surface 238 of filter cartridge 220. Thus, impermeable material 270 may assist with mounting or securing RFID tag 242 and/or absorbent material 260 to filter cartridge 220. In addition, impermeable material 270 may assist with hindering or preventing absorbent material 260 from collecting or absorbing liquid from locations other than the liquid collection location.

As discussed above, liquid collector 250 is positioned on casing 222. As shown in FIGS. 4, 5 and 6, liquid collector 250 may be positioned on casing 222 such that liquid collector 250 projects outwardly (e.g., radially outward) from exterior surface 234 of casing 222. Thus, e.g., when sidewall 223 of casing 222 is round, exterior surface 234 of casing 222 may define a diameter DC at liquid collector 250, e.g., in a plane that is perpendicular to the vertical direction V. Trough 252 of liquid collector 250 may also define a diameter DT, e.g., in a plane that is perpendicular to the vertical direction V. As shown in FIG. 4, the diameter DT of trough 252 may be larger than the diameter DC of exterior surface 234 of casing 222 at the liquid collector 250.

Liquid collector 250 also includes an installation assist fin 254. Installation assist fin 254 projects away from bottom portion 230 of casing 222, e.g., downwardly along the vertical direction V. The installation assist fin 254 is sized and positioned for allowing a user to grasp installation assist fin 254 in order to rotate filter cartridge 220 relative to manifold 210. Thus, installation assist fin 254 may extend across liquid collector 250. Installation assist fin 254 may extend downwardly along the vertical direction V from bottom portion 230 of casing 222 by at least one inch in certain exemplary embodiments.

Liquid collector 250 may also define or form symbols 259 thereon. Symbols 259 may instruct a user of filter assembly 200 with how to remove filter cartridge 220 from manifold 210 and/or align remove filter cartridge 220 relative to manifold 210 during mounting of filter cartridge 220 to manifold 210. Thus, as shown in FIGS. 4-7, symbols 259 may include a first arrow(s) directing a user to rotate filter cartridge 220 relative to manifold 210 in a first direction to remove filter cartridge 220 from manifold 210 and a second arrow(s) directing the user to rotate filter cartridge 220 relative to manifold 210 in a second, opposite direction to mount filter cartridge 220 to manifold 210. In addition, symbols 259 may include "front" and/or "back" wording that instructs a user regarding the alignment or orientation of filter cartridge 220 relative to manifold 210 when filter cartridge 220 is properly mounted to manifold 210. Other suitable symbols 259 may be formed on liquid collector 250 to instruct a user regarding operation of filter assembly 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter cartridge, comprising:
   a casing having an exterior surface and an interior volume, the casing mountable to a filter manifold, the casing also having a sidewall;
   a filter medium disposed within the interior volume of the casing;
   a radio-frequency identification (RFID) tag mounted to the casing at the exterior surface of the casing;
   a wicking material; and
   a leak collector mounted to the casing at a bottom portion of the casing, the leak collector having a trough that extends about the sidewall of the casing, the trough of the leak collector sized and positioned for receiving liquid flowing down the sidewall of the casing at the bottom portion of the casing,
   wherein the RFID tag is positioned above the trough of the leak collector, and
   wherein the wicking material extends between the trough of the leak collector and the RFID tag.

2. The filter cartridge of claim 1, wherein the exterior surface of the casing defines a diameter at the bottom portion of the casing, the trough of the leak collector also defining a diameter, the diameter of the trough being larger than the diameter of the exterior surface of the casing at the bottom portion of the casing.

3. The filter cartridge of claim 1, wherein the trough of the leak collector slopes towards the wicking material.

4. The filter cartridge of claim 3, wherein a highest point of the trough along a vertical direction is positioned opposite the wicking material about the casing.

5. The filter cartridge of claim 1, wherein the RFID tag is recessed within the casing at the exterior surface of the casing.

6. The filter cartridge of claim 1, wherein the casing and the leak collector are integrally formed with each other from a common material.

7. The filter cartridge of claim 1, wherein the leak collector is mounted to the casing via adhesive, spin welding or ultrasonic welding.

8. The filter cartridge of claim 1, wherein the leak collector has an installation assist fin that projects away from the bottom portion of the casing.

9. A filter assembly, comprising:
a manifold;
a filter cartridge removably mounted to the manifold, the filter cartridge comprising
a casing having an exterior surface and an interior volume, the casing also having a sidewall;
a filter medium disposed within the interior volume of the casing;
a radio-frequency identification (RFID) tag mounted to the casing at the exterior surface of the casing;
a wicking material; and
a leak collector mounted to the casing at a bottom portion of the casing, the leak collector having a trough that extends about the sidewall of the casing, the trough of the leak collector sized and positioned for receiving liquid flowing down the sidewall of the casing at the bottom portion of the casing,
wherein the RFID tag is positioned above the trough of the leak collector, and
wherein the wicking material extends between the trough of the leak collector and the RFID tag.

10. The filter assembly of claim 9, wherein the exterior surface of the casing defines a diameter at the bottom portion of the casing, the trough of the leak collector also defining a diameter, the diameter of the trough being larger than the diameter of the exterior surface of the casing at the bottom portion of the casing.

11. The filter assembly of claim 9, wherein the trough of the leak collector slopes towards the wicking material.

12. The filter assembly of claim 11, wherein a highest point of the trough along a vertical direction is positioned opposite the wicking material about the casing.

13. The filter assembly of claim 9, wherein the RFID tag is recessed within the casing at the exterior surface of the casing.

14. The filter assembly of claim 9, wherein the casing and the leak collector are integrally formed with each other from a common material.

15. The filter assembly of claim 9, wherein the leak collector is mounted to the casing via adhesive, spin welding or ultrasonic welding.

16. The filter assembly of claim 9, wherein the leak collector has an installation assist fin that projects away from the bottom portion of the casing.

* * * * *